US008407308B2

(12) United States Patent
Hornback, Jr. et al.

(10) Patent No.: US 8,407,308 B2
(45) Date of Patent: Mar. 26, 2013

(54) ADAPTIVE AND CONFIGURABLE APPLICATION SHARING SYSTEM USING MANUAL AND AUTOMATIC TECHNIQUES

(75) Inventors: Raymond R. Hornback, Jr., Lexington, KY (US); William M. Quinn, Lexington, KY (US); Mark S. Kressin, Lakeway, TX (US); James S. Johnston, Lexington, KY (US); Amy D. Travis, Arlington, MA (US); Kevin Solie, Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 1048 days.

(21) Appl. No.: 10/737,316

(22) Filed: Dec. 16, 2003

(65) Prior Publication Data

US 2005/0132045 A1 Jun. 16, 2005

(51) Int. Cl.
*G06F 15/167* (2006.01)
(52) U.S. Cl. ...................................... 709/216
(58) Field of Classification Search .................. 709/216
See application file for complete search history.

(56) References Cited

U.S. PATENT DOCUMENTS

| 6,006,231 | A * | 12/1999 | Popa ............................. 707/101 |
| 6,556,724 | B1 * | 4/2003 | Chang et al. .................... 382/224 |
| 6,971,110 | B1 * | 11/2005 | Marks et al. ................... 719/318 |
| 7,024,045 | B2 * | 4/2006 | McIntyre ........................ 382/239 |
| 7,149,776 | B1 * | 12/2006 | Roy et al. ....................... 709/205 |
| 7,227,938 | B2 * | 6/2007 | Rodman et al. ............ 379/202.01 |
| 7,426,539 | B2 * | 9/2008 | Datta ............................. 709/205 |
| 2001/0010059 | A1 * | 7/2001 | Burman et al. ................. 709/224 |
| 2002/0156884 | A1 * | 10/2002 | Bertram et al. ................ 709/224 |
| 2002/0169878 | A1 * | 11/2002 | Orenshteyn .................... 709/227 |
| 2003/0191860 | A1 * | 10/2003 | Gadepalli et al. .............. 709/247 |
| 2004/0073632 | A1 * | 4/2004 | Simpson et al. ................ 709/220 |
| 2004/0101272 | A1 * | 5/2004 | Boston et al. ..................... 386/46 |
| 2004/0181796 | A1 * | 9/2004 | Fedotov et al. ................ 719/323 |
| 2005/0114395 | A1 * | 5/2005 | Muralidharan ............. 707/104.1 |

OTHER PUBLICATIONS

Cheong et al. "A web-based collaborative enabled multimedia content authoring and management system for interactive and personalized online learning."; Proceedings International Conference on Computers in Education, 2002, vol. 2, p. 872-3 vol. 2, 4 refs, pp. 2 vol. xliii+1580.*

* cited by examiner

*Primary Examiner* — Ryan Jakovac
(74) *Attorney, Agent, or Firm* — Guerin & Rodriguez, LLP

(57) ABSTRACT

Described is a method for adapting an application sharing system for a network of computers according to user specific requirements. The method includes dynamically configuring system components and manually implementing user specific preferences to achieve a better user experience than is possible in typical application sharing systems. Users can configure the application sharing system based on their individual needs, and may need to modify their settings based on changing operating environments or usage patterns. The application sharing system can be dynamically configured based on content, current tasks, and changes in network conditions. System administrators can configure the application sharing system according to their general needs without preempting the needs of an individual user.

9 Claims, 5 Drawing Sheets

ADAPTIVE AND CONFIGURABLE APPLICATION SHARING SYSTEM USING MANUAL AND AUTOMATIC TECHNIQUES

FIELD OF THE INVENTION

The invention relates generally to application sharing systems. In particular, the invention relates to an application sharing system that dynamically adapts to the needs of a user and provides the user the ability to implement preferences.

BACKGROUND

Application sharing technologies allow computers to share data of interest between two or more users. Data generated by a sharing computer can include text or images for display and viewing by remote users. In some instances, remote users can share control of the data, permitting modifications to the data which can then be viewed at the sharing computer and any other remote computers, enabling users to collaborate on projects and tasks where joint decisions are desirable. Thus application sharing enables efficient collaboration between remote users working on a wide variety of tasks.

Typical application sharing systems operate according to algorithms based on predetermined requirements. For example, in image processing applications it can be desirable to reduce image transfer time. Thus some degradation in image quality may be acceptable to users. In another example, intermediate images are dropped to reduce latency and to keep a viewer's image in real time synchronization with the host image. Needs of the various users frequently are consistent so that the predetermined settings implemented by the algorithms are acceptable. However, in some instances users can have needs that conflict with the assumptions implemented by the algorithms.

The approaches adopted by current application sharing systems generally do not dynamically adapt to the user's needs. Instead, the systems typically utilize optimizations that can be achieved only under certain conditions. If the conditions change, the application sharing system can react in a manner that is adverse to the user's requirements. Moreover, current application sharing systems are generally unable to provide user control to avoid operation inconsistent with the user's needs.

The unpredictable nature of the data being shared can cause additional problems. For example, the type of image compression used to reduce the amount of data sent to the user is important. One image compressor can perform well when sharing a word processor, but might fail to significantly reduce or may even increase the amount data transferred when sharing an image processing application. The following examples demonstrate the needs of various users that can be inconsistent with default operation in typical application sharing systems.

In one example, a doctor sharing a medical image, such as an x-ray image, with a remote colleague over a high speed network is primarily concerned with image quality. There is no need to update the medical image in time. Moreover, the doctor does not want the risk that the colleague may misinterpret the image. Consequently, the latency of the transmission can be ignored. In this instance, a lossless image compression is desired.

In a contrasting example, a software developer sharing a text editor showing source code with an on-site support engineer through a modem does not want unnecessary delays in transmission. Instead of requiring high image quality, the software developer prefers that the text is legible and quickly available to the support engineer for viewing. Thus a lossy image compression is desirable to reduce the data transferred through the modem and any resulting latency.

What is needed is a method for configuring and dynamically adapting an application sharing system to accommodate the requirements of individual users. The present invention satisfies this need and provides additional advantages.

SUMMARY OF THE INVENTION

In one aspect, the invention features a method for configuring and dynamically adapting an application sharing system including a plurality of computers in communication over a network. One of the computers has a plurality of system components and shares an application with at least one other computer over the network. One of the system components is adapted to provide feedback to the shared application. The method includes determining a preference for the shared application, monitoring a feedback from the system component adapted to provide feedback, and configuring one of the system components in response to the determined preference and the monitored feedback. In one embodiment, the preference is a user preference. In another embodiment, the preference is an administrator preference.

In another aspect, the invention features a computer-readable storage medium containing a set of instructions for a computer having a user interface. The computer communicates with a remote computer through a network. The user interface includes an input device and a screen display. The set of instructions includes an input routine, a run routine and a configuration routine. The input routine is operatively associated with the user interface and permits a user to select a user preference on a menu shown on the screen display using the input device. The menu is associated with an applications sharing program accessible to the computer. The run routine monitors a feedback from a component of the application sharing program. The configuration routine is responsive to the selected user preference and the monitored feedback.

In another aspect, the invention features a computer data signal embodied in a carrier wave for use with a computer having a user interface and capable of communication with a remote computer through a network. The user interface has in input device and a screen display. The computer data signal includes program code operatively associated with the user interface for permitting a user to select a user preference on a menu shown on the display screen using the input device. The menu is associated with an applications sharing program accessible to the computer. The computer data signal also includes program code for monitoring a feedback from a component of the application sharing system and program code responsive to the selected user preference and the monitored feedback for configuring a component of the application sharing program. In one embodiment, the computer data signal also includes program code operatively associated with an administrator user interface to permit a system administrator to select an administrator preference on an administrative menu using the input device. The administrative menu is associated with the applications sharing program and is shown on the screen display.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not necessarily to scale, emphasis instead being placed upon illustrating the principles of the invention.

DETAILED DESCRIPTION

In brief overview the invention relates to a method for adapting an application sharing system to user specific requirements. The method includes dynamically configuring system components and manually implementing user specific preferences to achieve a better user experience than that possible in typical application sharing systems. Users can configure the application sharing system based on their individual needs, and may need to modify their settings based on changing operating environments or usage patterns. Additionally, the application sharing system can be dynamically configured based on content, current tasks, and changes in network conditions. Moreover, system administrators can configure the application sharing system according to their general needs without preempting the needs of an individual user.

U.S. patent application Ser. No. 10/737,064, filed Dec. 16, 2003, titled "Componentized Application Sharing," incorporated by reference herein in its entirety, describes an application sharing system in which multiple configurable components are available for specific tasks. According to the present invention, the configurable components are adapted to provide feedback to the shared application. Thus the shared application can monitor the feedback and dynamically respond to changing conditions according to changes in the user's environment (e.g., network changes and conditions) and the specific needs of the user. In addition, user interfaces allow users and administrators to dynamically set and modify preferences that affect the application sharing system.

An additional advantage of the present invention is realized using a profile that can store user preferences for later retrieval. The profile can be associated with a situation, such as a type of application. When the same application is used at a later time, the application sharing system automatically retrieves the profile associated with the application being shared. In this way, the user session starts with the software component configurations that were previously determined to be the most desirable, thus preventing the application sharing system from having to again determine the appropriate component configurations.

Figure 1:
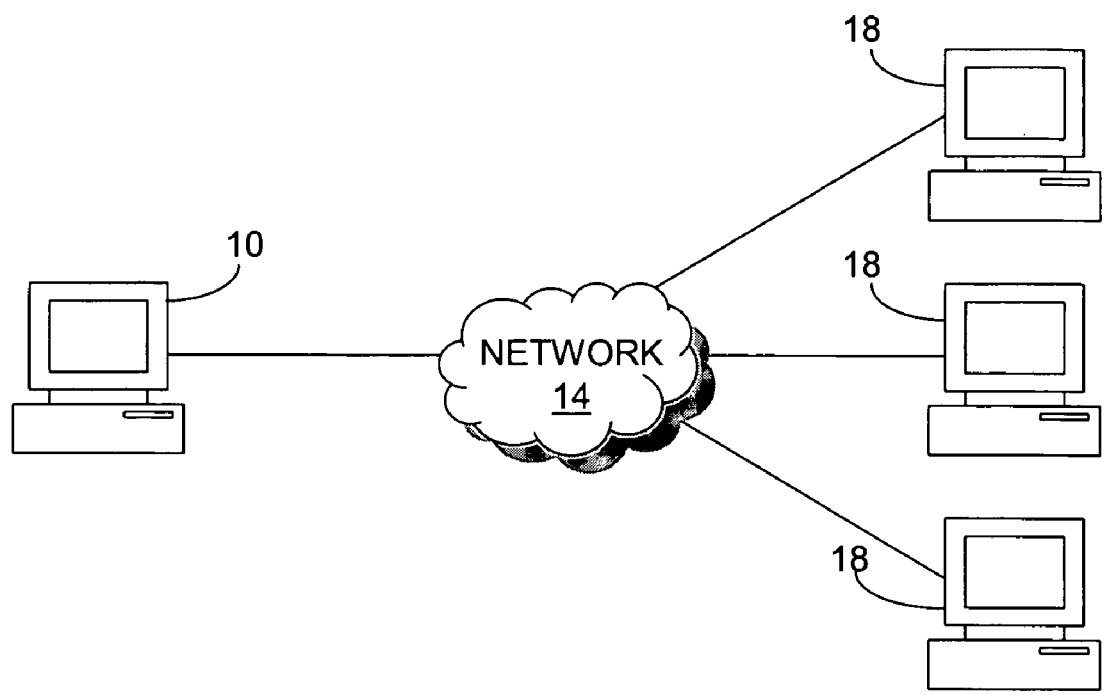
FIG. 1 is a schematic diagram depicting the architecture of a computer network within which an embodiment of a method for configuring and dynamically adapting an application sharing system in accordance with the invention can be implemented.

FIG. 1 illustrates a network architecture in which the present invention can be implemented. The architecture includes a sharing computer 10 communicating through a network 14 with one or more remote computers 18. As used herein, the phrase remote computer means any computer functionally independent, except for application sharing, from the sharing computer 14. The remote computers 18 can be located in the same facility as the sharing computer 10 or they may be located at a geographically remote site. The network 14 may be any one of a variety of types. For example, the network 14 can be a local area network (LAN) such as in a campus or office setting, or can be a more expansive network such as the Internet. In addition, the network 18 can be a single network or it can include multiple networks of the same or different types. In some implementations, the network 18 includes servers, routers, switches and other computing and communication devices.

Figure 2:
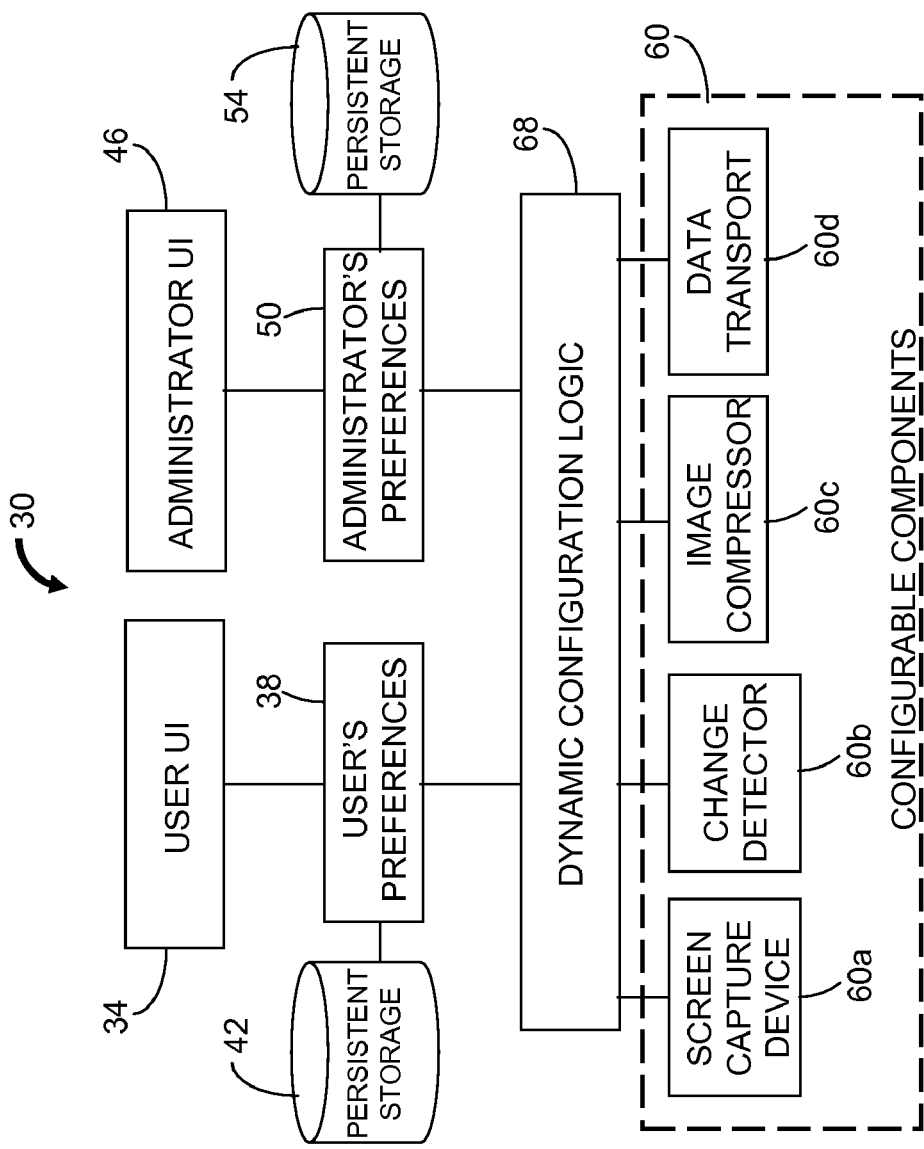
FIG. 2 is a functional block diagram of an embodiment of an application sharing system in accordance with the invention.

FIG. 2 is a functional block diagram illustrating an embodiment of an application sharing system 30 according to the principles of the present invention. The application sharing system 30 includes a user interface 34 to enable a user to specify and save user preferences 38 for use with specified applications. Users can choose to continue with previously saved user preferences (or default preferences) stored in memory 42 from a prior session or, alternatively, store the current preferences 38 in memory 42. The application sharing system 30 also includes an administrator user interface 46 to enable a system administrator to specify and save administrator preferences 50 in memory 54 for use with identified applications. Administrator preferences 50 affect all users under administration, such as all computers on a LAN. Administrator preferences 50 can be implemented as default user preferences which a user can change as desired. Alternatively, administrator preferences 50 can be used to override, or place limitations on, the user preferences 38. For example, an administrator preference 50 can limit the data rate available to a user to a predetermined value despite the user's desire to utilize a greater data rate. Similar to users, administrators can elect to use previously save settings or default settings.

The application sharing system 30 also includes configurable software components 60 that can be configured to achieve a desired result. Exemplary configurable components 60 are illustrated and include a screen capture component 60a, a change detector component 60b, an image compression component 60c, and a data transport component 60d. In other embodiments, other types of configurable components can be used. Each configurable component 60 includes a software module or algorithm designed to provide a specific functionality. The specific algorithm is selected from a group of algorithms defined in a database with their associated characteristics. For example, the image compression component 60c is a single compression algorithm selected from a group of compression algorithms. The group includes a variety of compression algorithms such as JPEG (Joint Photographic Experts Group) compression algorithms providing different levels of compression. Similarly, the change detector component 60b is an algorithm selected from a group of screen change detection algorithms. The change detector group can include a direct screen comparison as well as more complex algorithms based on monitoring active screen regions or intercepting GUI (graphical user interface) calls.

Dynamic configuration logic 68 processes the user preferences, administrator preferences and feedback from the components 60 to dynamically reconfigure the components 60 as necessary. Reconfiguration of a component 60 includes changing the current module or algorithm utilized by the application sharing system 30 to one of the other software modules or algorithms in the group associated with the component 60.

A configurable component 60 can generate feedback data for monitoring if the performance of the component 60 is of importance for the particular shared application. In one example, the image compressor component 60c feedback includes its compression ratio and average compression time image, and the data transport component 60d feedback includes the current data rate. The feedback data is used by the dynamic configuration logic 68 to allow for hot swapping of modules for the configurable components 60. In a more detailed example, if bandwidth availability decreases, the system 30 reacts by implementing an image compression algorithm having a higher compression ratio. When the available bandwidth later increases to greater than a threshold bandwidth, the image compression component 60c changes to a lower compression ratio algorithm. The selection of the appropriate compression algorithm can be based on additional parameters, such as the time required to compress the data. In some instances where data rates and image latency are critical, the selected compression algorithm may not simply result in implementation of an algorithm with the highest compression ratio.

Figure 3:
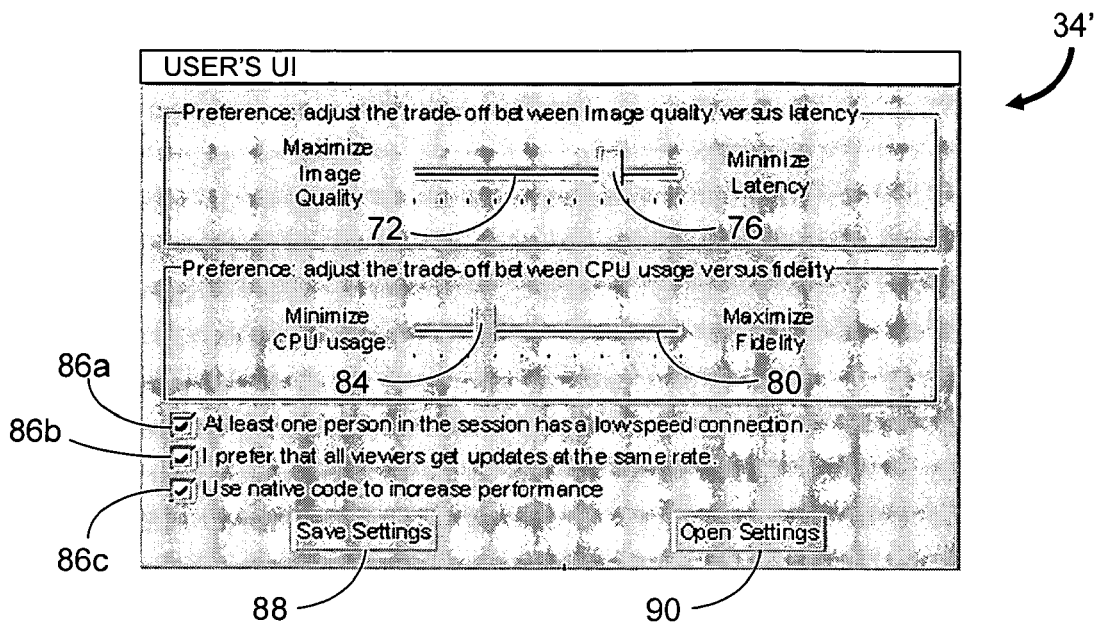
FIG. 3 depicts an embodiment of a user interface for an application sharing system in accordance with the invention.

FIG. 3 illustrates an example of a user interface 34' used to enter user preferences according to the invention. The user interface 34' includes a slide bar 72 and associated pointer 76 that is adjusted via an input device (e.g., a mouse) to indicate the user's preferred tradeoff between image quality and latency. For example, the user moves the pointer 76 to the left end of the slide bar 72 if image quality is of primary importance. Conversely, the user moves the pointer 76 to the right end of the slide bar 72 if the user desires minimum latency so that the image on the screen display of remote computers is in synchronization with the screen display of the sharing computer. A range of intermediate pointer positions is available to indicate the relative importance of image quality to latency. The user interface 34' also includes a slide bar 80 and pointer 84 to indicate the importance of limiting CPU time relative to the user's desire to maximize fidelity of the image.

The user interface 34' also includes selection boxes 86a, 86b and 86c for indicating known network limitations and requests. In the illustrated embodiment, the user has indicated that at least one user is known to be participating in the Application Sharing system over a low speed connection. In addition, the user has indicated a preference that all viewers receive updates at the same rate and that native code can be utilized on the hosting computer to increase performance. After completing changes in the user interface 34', the user selects the save settings button 88 to store the currently defined user preferences.

Figure 4:
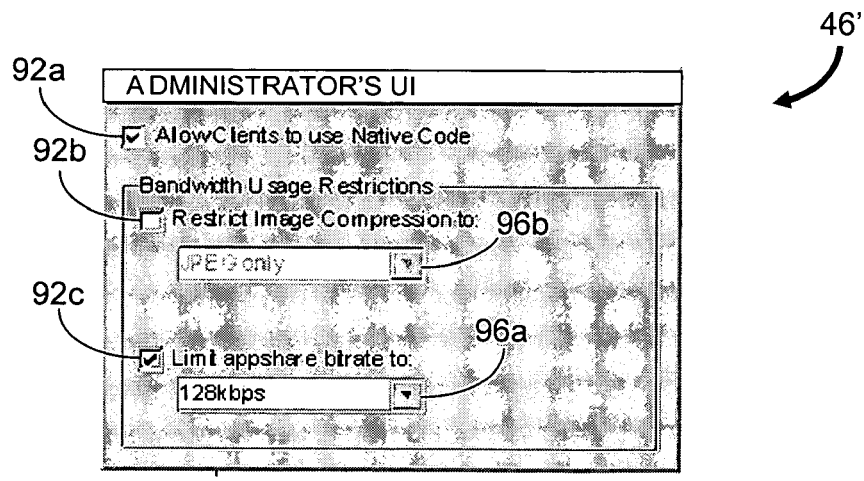
FIG. 4 depicts an embodiment of an administrator user interface for an application sharing system in accordance with the invention.

FIG. 4 illustrates an example of an administrator user interface 46' used to enter administrator preferences according to the invention. The administrator user interface 46' includes multiple selection boxes 92a, 92b and 92c for imposing various restrictions and limitations on users. As illustrated, the administrator has elected to permit clients to use native code and has limited user data rates to a maximum value selected from a pull down menu 96a. The administrator has not restricted image compression in this example. If a limitation is desired, checking the associated selection box 92b activates a pull down menu 96b from which a particular type of image compression (e.g., JPEG) can be selected.

It should be recognized by those of skill in the art that any number of tradeoff adjustments, limitations and request selections can be implemented in the user interface 34 and the administrator user interface 46. Moreover, the particular means for adjusting tradeoffs and indicating limitations and requests can be provided using other known forms of user interfaces, such as user interfaces having numerical entry fields.

Figure 5:
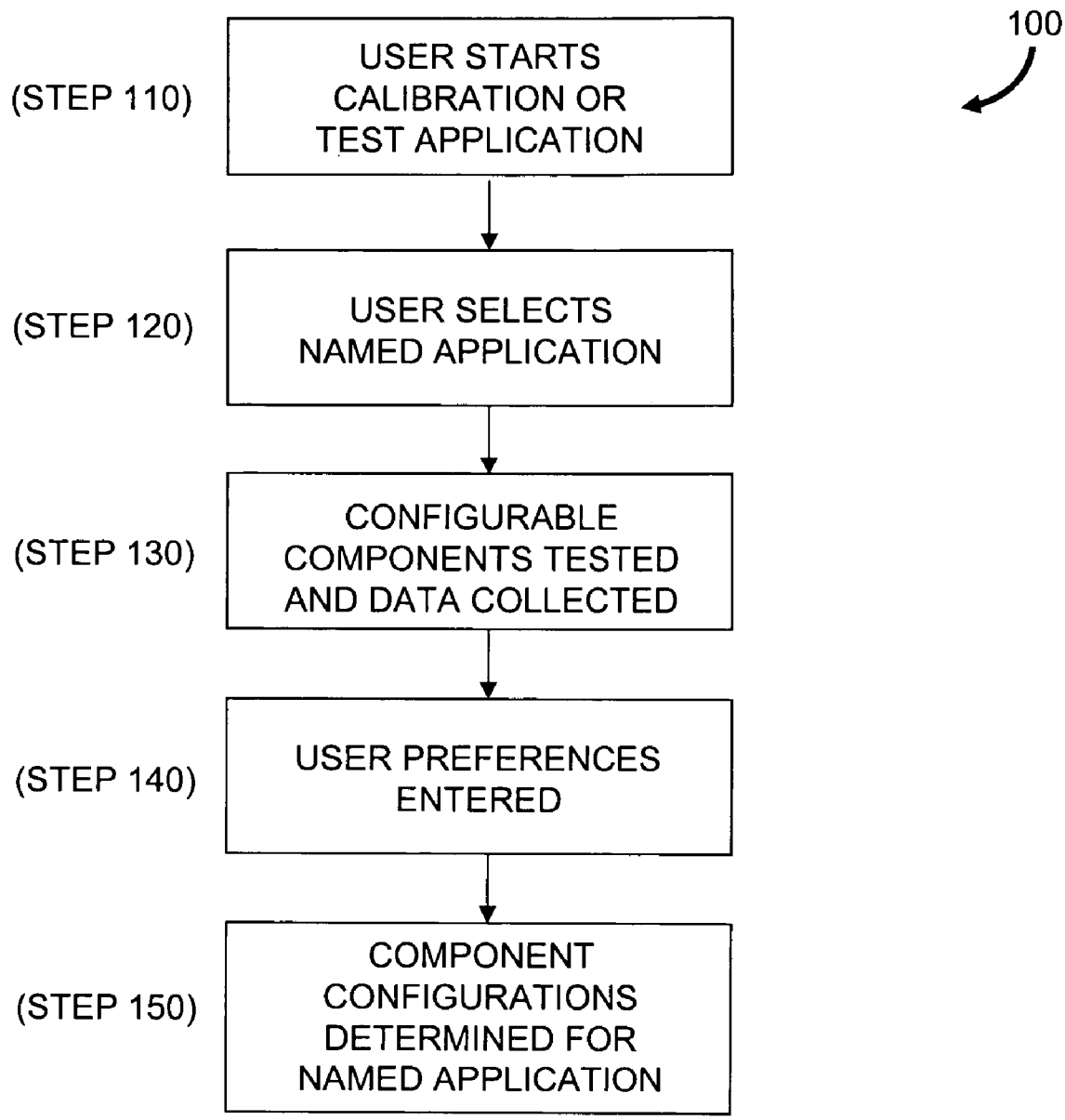
FIG. 5 is a flowchart representation of an embodiment of a method for calibrating an application sharing system in accordance with the invention.

The method of the invention can be performed for a number of circumstances, including calibration for a specific application or environment, initial setup for a first time use of a shared application, and initial setup based on existing settings. Referring to the flowchart of FIG. 5, a method 100 for calibration of the application sharing system for a specific application includes a user requesting (step 110) the start of calibration. Alternatively, the user starts a test application. The test application permits the user to appear to share the application without actually engaging in a conventional sharing session with other users. The test application returns recommended settings or dynamically configures itself based on the type of application being shared. The resulting settings can be stored in profiles and used according to the particular application being shared. In one embodiment, the test application is accessed and performed from a webpage. The application to be shared is executed (step 120). The configurable components are tested during the execution of the shared application and data is stored (step 130) for evaluation. The collected data is the same type of data that are monitored and collected during a normal sharing session. For example, when calibrating with an image application, the collected data indicate image performance and are indicate whether the present image compressor is performing satisfactorily. The next time a user attempts to share using the same image application, the system may exclude the image compressor if the calibration data were unsatisfactory. The user then enters (step 140) preferences for the shared application. Based on the collected data and the user preferences, optimal component configurations are determined (step 150) for the shared application and stored for that user. The component configurations are saved with the named application and are used for all application sharing sessions with the named application unless preferences are changed or a component is determined not to satisfy a user need.

If no calibration has occurred and the user joins an application sharing session, no saved preferences may be available for configuring the components. In this instance, the application sharing system uses default settings. If settings were previously stored for the shared application, the component configurations are based on the stored settings. In either instance, the settings are used until user a change event is detected. Change events include the subsequent entry of user preferences and administrator preferences, and a determination that a component does not satisfy the current settings.

Figure 6:
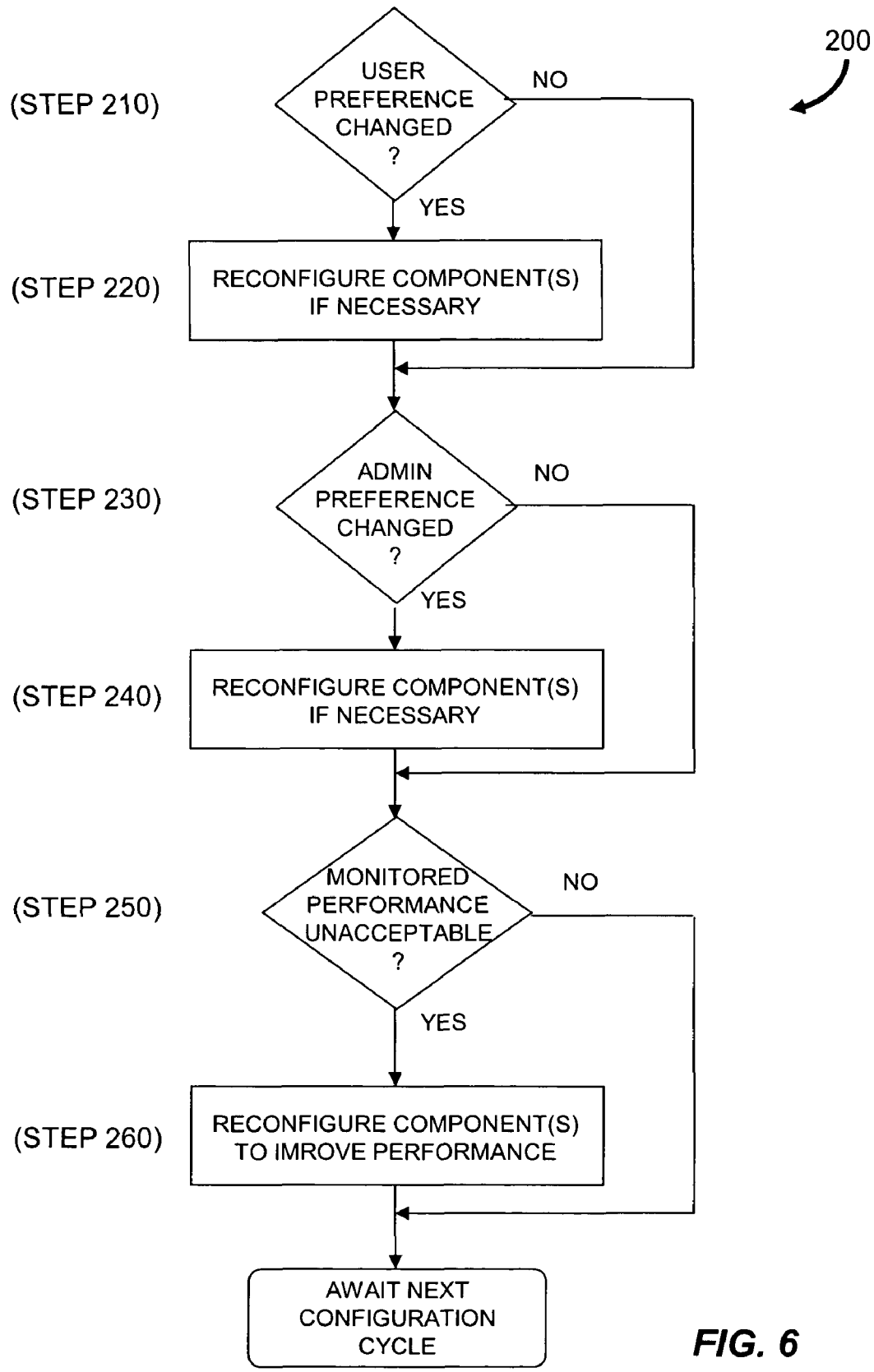
FIG. 6 is a flowchart representation of an embodiment of a method for configuring and dynamically adapting an application sharing system in accordance with the invention.

FIG. 6 is a flowchart representation of an embodiment of a method 200 for configuring and dynamically adapting an application sharing system according to the invention. The method 200 includes determining (step 210) if a user preference has changed. If it is determined that a user preference has changed and that the current state of the shared application is inadequate for the user preferences as now defined, one or more components are reconfigured (step 220) to achieve compliance with the user preferences. Similarly, if it is determined (step 230) that an administrator preference has been changed, one or more components are reconfigured (step 240) to satisfy the administrator's current requirements. The reconfigurations are dynamic, that is, the components are reconfigured during the application sharing session as necessary to respond to the changed preferences as they occur. The dynamic reconfigurations do not result in any interruption to the user and no user notification occurs.

The method 200 also includes determining (step 250) whether performance, as determined by feedback from one or more of the configurable components, is unacceptable based on user preferences, administrator preferences, and application sharing requirements. If required, one or more of the components are reconfigured (step 260) to achieve satisfactory performance.

While the invention has been shown and described with reference to specific embodiments, it should be understood by those skilled in the art that various changes in form and detail may be made therein without departing from the spirit and scope of the invention.

What is claimed is:

1. A method for configuring and dynamically adapting an application sharing system comprising a plurality of computers in communication over a network, one of the computers sharing an application with at least one other computer over the network, the method comprising:
    providing at least one of the plurality of computers with a plurality of system components, one of the system components adapted to provide feedback to the shared application;
    determining a preference for the shared application, wherein the preference includes at least one of a user preference or an administrator preference;
    reconfiguring at least one component of the plurality of system components in response to a determination of a change in the at least one of the user preference and the administrator preference;
    monitoring by the one of the computers the feedback generated by the one of the system components;
    determining in response to monitoring the feedback whether the system component is performing satisfactorily, said feedback indicating the performance of the component relative to the determined preference; and
    configuring the one of the system components in response to the determined preference and the monitored feedback, said configuring comprising adjusting an algorithm used to implement the one of the system components adapted to provide feedback to the shared application, the configuring of the system component causing an adjustment in the performance of the shared application for a plurality of computers sharing the application.

2. The method of claim 1 wherein the system component comprises one of a compression algorithm, a change detection algorithm, a screen capture device and a data transport type.

3. The method of claim 1 wherein the preference is a user preference.

4. The method of claim 3 wherein the user preference defines at least one of an image quality and a latency.

5. The method of claim 3 wherein the user preference defines at least one of a CPU usage and a fidelity.

6. The method of claim 1 wherein the preference is an administrator preference.

7. The method of claim 6 wherein the administrator preference limits the selection of a user preference according to a maximum data rate.

8. The method of claim 6 wherein the administrator preference limits the selection of a user preference according to an image compression type.

9. The method of claim 1 further comprising selecting the preference for the shared application.

* * * * *